United States Patent Office 2,872,367
Patented Feb. 3, 1959

2,872,367

INSECTICIDAL COMPOSITIONS CONTAINING 9,9'-BIFLUORYLIDENE

Harry L. Haynes, Bronxville, and Anthony A. Sousa, Hastings, N. Y., and Bernard B. Lampert, North Plainfield, N. J., assignors to Union Carbide Corporation, a corporation of New York No Drawing. Application September 14, 1954
Serial No. 456,082

15 Claims. (Cl. 167—30)

This invention relates to 9,9'-bifluorylidene or dibiphenylene-ethylene, and to compositions containing it which have been found to be valuable and unique in the biological field, particularly in the field of insecticides.

In the biological field extensive research is continually in progress looking toward the discovery of materials possessing unique properties which can be used to advantage, for instance in producing desired effects at a lower cost or with less effort or with safety to one type of life while exhibiting toxicity toward another type of life. In the field of insecticides desiderata are high toxicity to insects, low cost, versatility so that the same material may be used against a number of different insects in order that the agriculturist is not required to keep on hand nor to apply a number of different insecticides, and safety to both plants and mammals. It has been discovered that these and other desiderata are found in 9,9'-bifluorylidene, having the graphic formula:

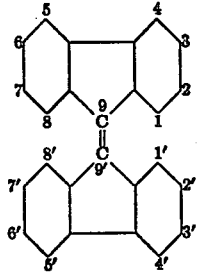

hereinafter sometimes referred to as bifluorylidene. In general, derivatives of bifluorylidene which have the double bond at the 9,9'-position broken, for instance 9,9'-bifluorenyl or a bifluorenyl derivative, for instance 9,9'-dinitro-9,9'-bifluorenyl or 9,9'-dichloro-9,9'-bifluorenyl, have greatly reduced insecticidal characteristics. Certain derivatives of bifluorylidene which result from substitution of the aromatic nuclei, for example 2,2'-dichloro-9,9'-bifluorylidene also exhibit greatly reduced insecticidal characteristics. The association of adducts or the formation of complexes with bifluorylidene give products having insecticidal properties, for instance the picric acid, 1,3,5-trinitrobenzene, chloranil, and 2,4,7-trinitrofluorenone complexes. The combination of sulfur with bifluorylidene likewise gives products having insecticidal properties.

The compound bifluorylidene has been proposed as a starting material for the production of fluorenone (Jaeger U. S. P. 1868531). Bifluorylidene may be prepared from 9-bromofluorene by treatment with methanolic potassium hydroxide in acetone solution, the bromofluorene having been synthesized by direct bromination of fluorene in carbon tetrachloride solution under the influence of ultra violet irradiation. Bifluorenyl and its derivatives and the derivatives of bifluorylidene may be prepared in known manner. The bifluorylidene complexes may, in general, be prepared by dissolving bifluorylidene and the adduct in a common solvent and then eliminating the solvent for instance, as the picric acid adduct is prepared by dissolving bifluorylidene and picric acid in chloroform and collecting the product by filtration. The bifluorylidene-sulfur combinations may be prepared by a simple heating of the two components until a homogeneous product is obtained.

In general, the materials contemplated herein are somewhat soluble in acetone, benzene, carbon tetrachloride, chloroform, chlorobenzene, ethyl alcohol, isopropyl alcohol, phenyl acetate, acetic anhydride, acetic acid, toluene, cyclohexene, tetralin, tert.-butyl alcohol, phenyl methyl ether, isoamyl ether, dioxane, dibenzyl ether, ethyl acetate, methylated naphthalenes, and "Tergitol Dispersant NPX" a proprietary non-ionic alkyl phenyl polyethylene glycol ether.

9,9'-bifluorylidene is a red, crystalline solid melting at about 190° C. and having a low water solubility of less than 1 part by weight in a million parts of water at 25° C.

The chemicals referred to herein (representative structural formulae being given) are:

No. 1—9,9'-bifluorylidene or dibiphenylene-ethylene
No. 2—9,9'-bifluorylidene picrate complex; concentrated chloroform solutions of one equivalent of bifluorylidene and one equivalent of picric acid are mixed and the less soluble complex which precipitates is collected by filtration
No. 3—9,9'-dibromo-9,9'-bifluorenyl

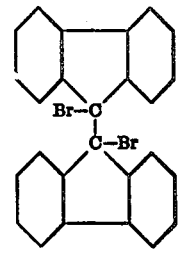

No. 4—9,9'-dinitro-9,9'-difluorenyl
No. 5—2,2'-dinitro-9,9-bifluorylidene

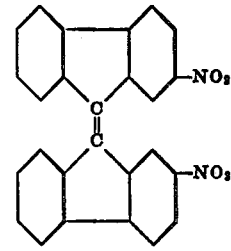

No. 6—9,9'-bifluorenyl

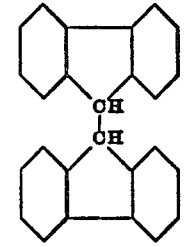

No. 7—2,2'-dichloro-9,9'-bifluorylidene
No. 8—9,9'-dichloro-9,9'-bifluorenyl
No. 9—9,9'-bifluorylidene sulfur complex; one equivalent of bifluorylidene and one equivalent of sulfur heated together at 240° C. until homogeneous No. 10—9,9'-bifluorylidene sulfur complex; homogeneous melt of 1 equivalent of bifluorylidene and 2 equivalents of sulfur at 240° C.

No. 11—9,9'-bifluorylidene sulfur complex; homogeneous melt of 1 equivalent of bifluorylidene and 1 equivalent of sulfur at 190° C.

No. 12—9,9'-bifluorylidene sulfur complex; homogeneous melt of 1 equivalent of bifluorylidene and 1 equivalent of sulfur at 280° C.

No. 13—9,9'-bifluorylidene chloranil complex; concentrated benzene solutions of one equivalent of bifluorylidene and one equivalent of chloranil are mixed; the complex which precipitates is recovered by filtration No. 14—9,9'-bifluorylidene-2,4,7-trinitrofluorenone complex; prepared as No. 13 using equal equivalents of the components.

No. 15—9,9' - bifluorylidene - 1,3,5 - trinitrobenzene complex; prepared as No. 13 using equal equivalents of the components.

In testing the chemicals contemplated herein, as well as related chemicals, against chewing insects, Mexican bean beetle larvae (*Epilachna varivestis* Muls.) was chosen as a representative test insect and tender green bean plants as a representative test plant. Aqueous suspensions of chemicals Nos. 1–8, inclusive, were prepared at the rates of 0.25 gram of the chemical dissolved in 10 milliliters (10 percent of the final volume of the suspension) of acetone in which was also dissolved 0.025 g. (10 percent of the weight of the chemical) of a non-ionic wetting and emulsifying agent which solution was added to sufficient water to give 100 ml. of the suspension upon agitation. The specific emulsifier used was "Tergitol Dispersant NPX." The suspensions thus prepared and containing 0.25 percent of the chemical were sprayed on the bean plants to run-off. After the plants were dry (about one hour after spraying) each plant was infested with a given number of fourth instar Mexican bean beetle larvae and then the leafy portion of the plant and the larvae were enclosed in a spherical wire mesh cage; and 72 hours after the infestation observations were made of the damage to foliage by the feeding larvae. The results of the tests are given in the following Table 1.

TABLE 1

Chemical No.:                          Rating
1 ———————————————————————————— A
2 ———————————————————————————— A
3 ———————————————————————————— C
4 ———————————————————————————— E
5 ———————————————————————————— E
6 ———————————————————————————— E
7 ———————————————————————————— E
8 ———————————————————————————— E The system of rating is:

A—0–5% of foliage eaten
B—6–15% of foliage eaten
C—16–40% of foliage eaten
D—41–70% of foliage eaten
E—71–100% of foliage eaten Chemical No. 1 having shown high toxicity in the first test, it was treated at lower concentrations together with other bifluorylidene complexes (chemicals Nos. 9, 10, 11, 12, 13, 14, and 15). For this test aqueous suspensions of the respective test chemical, acetone, dispersant and water were prepared as described for the previous test and then diluted with water to give the weight of chemical stated on the following Table 2. In this test the plants were sprayed, infested with Mexican bean beetle larvae and caged as previously described. Counts were made, 72 hours after infestation, of the number of living and dead larvae, the percentage of dead larvae based on the total number of larvae being given as "percent mortality" on the following Table 2.

TABLE 2

| Chemical No. | mg. of chemical per 100 ml. of water | Mexican bean beetle larvae, percent Mortality at 72 hrs. |
| --- | --- | --- |
| 1 | 15 | 91 |
|   | 7.5 | 69 |
|   | 3.8 | 33 |
| 9 | 15 | 81 |
|   | 7.5 | 44 |
|   | 3.8 | 14 |
| 10 | 15 | 69 |
|   | 7.5 | 38 |
|   | 3.8 | 5 |
| 11 | 15 | 73 |
|   | 7.5 | 50 |
|   | 3.8 | 5 |
| 12 | 15 | 70 |
|   | 7.5 | 55 |
|   | 3.8 | 5 |
| 13 | 15 | 86 |
|   | 7.5 | 57 |
|   | 3.8 | 28 |
| 14 | 15 | 76 |
|   | 7.5 | 33 |
|   | 3.8 | 14 |
| 15 | 15 | 67 |
|   | 7.5 | 32 |
|   | 3.8 | 5 |

Chemical No. 1 having shown exceptional toxicity in the first and second tests, this toxicant was tested in comparison with rotenone, the tests being conducted in the manner stated in connection with Table 2. The concentrated suspensions were prepared in the manner stated in connection with Table 1 from 30 mg. of chemical No. 1 or rotenone
20 ml. acetone
3.0 mg. Tergitol Dispersant NPX
Water to 200 ml.

Sprays with lower concentrations of the toxicants were prepared by diluting the above suspension, 80 milliliters of the suspensions being sprayed on the bean plants, this being sufficient to wet the plants thoroughly to run-off. Mortality counts of Mexican bean beetle larvae were taken 72 hours after infestation. The concentrations of the toxicants and the mortality of the larvae are shown in the following Table 3.

TABLE 3

*Results of 3-day exposure of Mexican bean beetle larvae to bean plants sprayed with indicated compounds*

| Chemical | mg. of chemical, 100 ml. of water | Percent Mortality at 72 hrs. |
| --- | --- | --- |
| No. 1 | 15 | 100 |
|   | 3.8 | 52 |
|   | 0.95 | 7 |
| Rotenone | 15 | 59 |
|   | 3.8 | 15 |
|   | 0.95 | 0 |
| Untreated |   | 0 |

The data indicate that chemical No. 1 is noticeably more toxic than rotenone to Mexican bean beetle larvae at very low dosages.

Chemical No. 1 having shown exceptional toxicity in the previous tests, this toxicant was again tested in comparison with rotenone the tests being conducted in a manner to show the residual toxicity of chemical No. 1 in comparison with rotenone. For these tests suspensions were prepared in the manner stated in connection with Table 3. The plants were sprayed thoroughly to run-off and were then held at room temperature under fluorescent light. After five days under the fluorescent light some of the plants were infested with larvae of Mexican bean beetle. Other plants sprayed with the suspensions were infested with larvae after being exposed to the fluorescent light for seven days. Mortality counts of the larvae were made 72 hours after the respective infestations. The concentrations of the toxicants, the number of days that the plants were held under the fluorescent light and the mortality of the larvae are shown in the following Table 4.

TABLE 4

*Percent mortality of Mexican bean beetle larvae placed on plants 5 and 7 days after plants were sprayed*

| Chemical | mg. of chemical per 100 ml. of water | Percent Mortality | |
|---|---|---|---|
| | | 5 days | 7 days |
| No. 1 | 15 | 100 | 100 |
| | 7.5 | 100 | 75 |
| | 3.8 | 50 | 13 |
| Rotenone | 15 | 25 | 0 |
| | 7.5 | 13 | 0 |
| | 3.8 | 25 | 0 |
| Untreated | | 0 | 0 |

Chemical No. 1 was also tested for the control of southern armyworm larvae *Prodenia eridania* (Cram.). For this test the larvae were placed on bean plants which were then sprayed with suspensions of chemical No. 1 at concentrations of 0.125 percent and 0.06 percent. The suspensions were prepared in the manner previously stated using a given amount of chemical, dispersant equal to 10 percent by weight of the chemical, acetone equal to 10 percent by volume of the volume of the concentrated suspension and sufficient water to give the desired volume of the concentrated suspension. The spray of lower concentration was made by diluting the spray of higher concentration. After spraying the plants and larvae, each plant was held for a period of 72 hours in a wire mesh cage whereupon mortality readings of the larvae were made. Chemical No. 1 at a concentration of 0.125 percent gave a 90 percent mortality and at 0.06 percent gave an 84 percent mortality of armyworm larvae.

In making the tests previously given it was noted that the sprays were not phytotoxic to the plants at the concentrations of chemicals used. However, it was desired to test chemical No. 1 in the field for phytotoxicity on the representative plants cabbage, broccoli, and tomato as well as bean. For this purpose dusts were prepared containing 1 part and 0.5 part of chemical No. 1 in sufficient inert particulate carrier to give 100 parts by weight. The carrier used was a finely divided pyrophyllite as representative of such inert carriers as infusorial earth, clay, talc, pumice, bentonite and the like. An aqueous suspension of chemical No. 1 was also prepared in the manner previously stated comprising acetone and "Tergitol" dispersant to give a suspension containing 0.03 part of the chemical in 100 parts of suspension, by weight. Three applications of the dusts and suspensions were made to the plants at approximately 10 day intervals, the dusts being applied so that complete coverage of the foliage was obtained and the aqueous suspension being sprayed on the plants to runoff. Notations as to phytotoxicity were made 7 days after each application of the spray and dust; there was no phytotoxicity at any time to any of the cabbage, broccoli, bean or tomato plants sprayed or dusted.

Chemical No. 1 acts as a poison in the blood stream of insects and in order to determine the LD50 value on the American roach, *Periplaneta americanum* (L.), a 10 percent solution of the chemical was made in an injection fluid consisting of, by volume, 10 percent xylene, 5 percent ethanol (95 percent), 10 percent acetone and 75 percent refined petroleum distillate. Ten gms. of the chemical were dissolved in sufficient injection fluid to give 100 ml. Using a micro pipette, amounts varying from 0.004 to 0.006 ml. of this mixture were injected into the roach blood stream. The results of the tests are shown in the following Table 5.

TABLE 5

*Laboratory results obtained with chemical No. 1 by injection into the blood stream of American roach*

| Chemical | Approximate LD50 in mg./gm. of body weight | |
|---|---|---|
| | Male | Female |
| No. 1 | 0.03 | 0.05 |

The injection of the injection fluid without the chemical at the rates used to give the LD50 value shown in the above table killed none of the insects.

Chemical No. 1 was tested for toxicity to mosquito larvae *Aedes aegypti* L.). For this test an acetone concentrate of the chemical was made by dissolving 1 gram of the chemical in sufficient acetone to give 100 ml. Varying amounts of this solution were then mixed with water and third instar mosquito larvae were introduced into the treated water. Mortality counts made 48 hours after the introduction of the larvae showed kills ranging from zero where the suspension was very dilute to 100 percent where the suspension was more concentrated. The median lethal dose (50 percent kill) was found to be 0.03 part of the chemical per million parts of water by weight. Kills of 75, 90 and 100 percent were obtained, respectively, with dosages of 0.06, 0.1 and 0.5 part of the chemical per million parts of water. Control tests in which acetone was added to water in the proportion that acetone plus the chemical gave 100 percent kill, killed none of the larvae.

The mammalian toxicity of chemical No. 1 was tested by introducing varying amounts of the chemical into the stomachs of test rats by means of a stomach tube. The test is more fully described in a paper by Henry F. Smyth, Jr., and Charles P. Carpenter published in The Journal of Industrial Hygiene and Toxicology, volume 26, No. 8, October 1944. The tests showed that the acute oral LD50 dose to rats is in the approximate range of 20–30 gms./kg. indicating a mammalian toxicity hazard which is substantially nil in view of the minute amount of chemical which might be ingested by humans or animals eating plants to which had been applied sufficient of the chemical to keep the plants free from insect pests.

The low mammalian toxicity of chemical No. 1 and its high insect toxicity indicated the possibility of using it as an insecticide against insects which infest stored grain. Rice weevil (*Sitophilus oryza* L.) was chosen as a representative insect for the test and wheat as a test grain representative of wheat, rice, oats, grass and other seeds and the like. Formulations were prepared containing 2, 3, 4 and 5 parts by weight of chemical No. 1 in sufficient inert particulate diluent to make 100 parts. Specificially, the diluent was a wheat dust. For comparative purposes a dust was prepared from 98.82 parts by weight of the diluent and 1.18 parts of a toxicant composed of 0.08 part pyrethrins+1.1 parts piperonly butoxide, this toxicant dust now being marketed for use as a grain protectant. Bottles half filled with wheat were tumbled with the dusts at dosages equivalent to 50, 100 and 200 lbs. of the formulated dust per 1000 bushels of wheat. Thereafter rice weevils were introduced into the bottles which were lightly covered with cheesecloth to provide access of air to the wheat and insects. The bottles were allowed to stand at room temperature in a dark cabinet to reproduce storage and package conditions of grain, seeds, flour and the like. Mortality readings of the weevils were taken 7 days after the treatment of the wheat and after the introduction of the weevils into the bottles. The results of the tests, given in the following table indicate that the treatment with chemical No. 1 is as effective as the treatment with the commercial toxicant, and advantage of chemical No. 1 being its lower cost for equivalent protection.

TABLE 6

*Mortality results of rice weevil after 7 day exposure to indicated dust formulations*

| Formulation | | | |
|---|---|---|---|
| Gms. of dust/lb. of wheat | 1.504 | 0.752 | 0.376 |
| Lbs. dust/1,000 bu. wheat | 200 | 100 | 50 |
| | Rice Weevil Adult—Percent Mortality 7 Days | | |
| Commercial Wheat Protectant (0.08 pyrethrins +1.1 piperonyl butoxide +98.82 dust) | 98 | 68 | 31 |
| Chemical No. 1: | | | |
| 2% in dust | 94 | 86 | 57 |
| 3% in dust | 98 | 86 | 67 |
| 4% in dust | 95 | 92 | 76 |
| 5% in dust | 98 | 95 | 84 |

The compositions comprising the chemicals contemplated herein may be used to treat paper, paper products and other materials used in the packaging and other arts to render the packaging material resistant to insects, particularly packaging materials used as containers for mammalian foods. Solutions of the chemicals in a readily volatile solvent such as acetone or refined petroleum distillate may be sprayed on or otherwise applied to the packaging material or to the package, or suspensions of the materials may be used during the production of the paper from which the package is ultimately made. The insecticides may be applied to the paper by adding them at the sizing press or as a slurry applied to the paper after it has been made, for instance by spraying. Furthermore, as the insecticides are soluble in lacquer solvents they may be applied to the paper when the paper is lacquered for waterproofing purposes. The packages are thereby rendered resistant to insects and safe to store for prolonged periods.

Chemical No. 1 was tested as a poison bait for house flies. For this purpose concentrated bait suspensions were prepared in the manner stated in connection with Table 1 from:

120 mg. of chemical No. 1
10 ml. acetone
12 mg. of Tergitol Dispersant NPX
Water (containing 5000 mg. of sugar per 100 ml.) to 200 ml.

Bait suspensions containing lower concentrations of the toxicants were prepared by diluting the above suspension with water containing the same sugar content. In making the test 50 ml. of each suspension was poured into a feeding dish containing absorbent cotton, this being a sufficient amount to thoroughly saturate the cotton. The dishes containing the bait were then introduced into a mesh wire rearing cage containing approximately 500 adult five day old flies and 24 hours after the introduction of the bait mortality counts were taken. The concentration of the toxicants and the mortality of the flies are shown in the following Table 7.

TABLE 7

*Results of 24 hour exposure of the common house fly to baits containing the indicated ingredients*

| Concentration in mg./100 ml. | | | | Percent Mortality 24 hours |
|---|---|---|---|---|
| Chemical No. 1, mg. | NPX, mg. | Acetone, ml. | 5% Sugar Water | |
| 60 | 6 | 5.0 | to 100 ml. | 88 |
| 30 | 3 | 2.5 | to 100 ml. | 79 |
| 15 | 1.5 | 1.25 | to 100 ml. | 72 |
| 7.5 | 0.75 | 0.625 | to 100 ml. | 45 |
| 0 | 6 | 5 | to 100 ml. | 0 |

In another test on house flies a concentrated bait was prepared by adding 2 grams of chemical No. 1 to 98 grams of granulated sugar. This mixture was then thoroughly ground until the entire sample was homogeneous and further mixed by tumbling in a ball mill. Lower bait concentrations were prepared by adding sugar in known amounts of the above concentrate. Each diluted bait was also thoroughly ground and tumbled to insure uniformity of the mixture. In making the test 2000 mg. of the prepared bait were put in a dish and placed in a rearing cage containing 500 five day old flies. A separate dish of water was also provided since a previous test had shown that the dry bait alone would result in an abnormally high mortality of the control cages. Twenty-four hours after the introduction of the bait mortality counts were taken. Mortality counts and ingredient content of the baits are presented in the following Table 8:

TABLE 8

*Results of 24 hour exposure of the common house fly to baits containing the indicated ingredients*

| Concentration in mg. | | Percent Mortality |
|---|---|---|
| Chemical No. 1 | sugar | |
| 20 | 1,980 | 80 |
| 10 | 1,990 | 79 |
| 5 | 1,995 | 50 |
| 2.5 | 1,997.5 | 23 |
| 0 | 2,000 | 0 |

The toxicants contemplated herein may be used with or without "addends," for instance adjuvants of the type which cause the toxicants to adhere to those parts of the plant or other material which are to be rendered resistant to insects and prevent the loss of the toxicants from the treated material for example, in the case of plants, loss due to wash-off by rain, blowing-off by winds and the like, for instance blood albumin or skimmed milk and these materials cause the toxicants to adhere evenly and strongly to grains, seeds and the like. The addends may be extending materials or diluents which facilitate the measuring of and the application of the small amounts of the active materials which are desirable to be applied to the material to be protected, for instance talc and the other extenders previously mentioned. These addends are preferably water-insoluble adhesive and extending agents and, in the case where the insecticides are to be applied to plants, are non-phytotoxic.

The toxicants contemplated herein are not deleteriously affected by suitable adjuvants and additives, for instance blood albumin or skimmed milk, nor are the phytotoxic properties of the toxicants affected by such agents. However, the toxicants are preferably not applied to plants in solution in non-volatile solvents, for instance, oils of the type which are, of themselves, phytotoxic although such oil solutions may be used in treating paper, cardboard and the like. It is a feature of the invention that the toxicants contemplated herein are so chemically inert that they do not react with the various agents nor do they react chemically with the foliage or other parts of the plant or seed, either with or without the additive agents, in a deleterious manner.

For application to those parts of the plant which are above ground, the toxicants are preferably applied as water base sprays, the sprays containing the toxicants in finely divided condition, this condition easily being obtained by mixing a solution of the toxicant in a water soluble solvent, for instance acetone, into a larger volume of water whereupon the toxicants are thrown out of solution in the finely divided substantially colloidal condition. In the final spray, the acetone is present in only minute amount and that amount quickly volatilizes as the spray dries. The preferred solvents are highly volatile. Where the toxicants are used as insecticides in grain or seed treatments, they may be applied to the grain or seeds as a dust, preferably with an adhesive adjuvant, merely being tumbled with the seeds or grain as previously described. To obtain a dust, either a concentrate or a dilute composition, having the toxicant in extremely finely divided form or a solution of the toxicant in a volatile solvent, may be mixed into a particulate extender, for instance talc or an adhesive adjuvant, and then dried. The volatilization of the solvent deposits the toxicant on the extender in substantial colloidal sized particles. Aqueous spray compositions may also be prepared by grinding the toxicants in water to make a concentrated dispersion, or even with so little water as to make a paste which is then incorporated at the point of use with sufficient additional water to give a spray wherein the toxicant has the desired concentration. The concentrates, either in the form of solutions or concentrated aqueous suspensions or pastes or dusts may contain such other components of the spray as are desirable, for instance nicotine sulfate or other insecticide or a fungicide.

The concentrates from which the ultimate aqueous sprays or dusts are to be prepared preferably contain between 10 and 75 parts by weight of the toxicant with sufficient additional material either inert or active (for instance a contact insecticide or a fungicide) to make 100 parts by weight. The ultimate sprays or dusts are prepared by adding a convenient amount of additional material including inerts and such addends, for instance nicotine sulfate or other contact insecticide and fungicide, as may be desired in the spray or dust schedule and as the agriculturist is in the habit of using, so that when the crop plants are thoroughly dusted or sprayed, the toxicants herein contemplated are applied at rates of from 10 to 60 lbs. of 1% to 10% dusts per acre or ⅛–8 lbs. active ingredient in 100 gallons of water per acre for sprays. Whether the toxicants are applied in dust formulations or as aqueous sprays, they are preferably applied in finely divided form. Aqueous sprays prepared by mixing a solution of the toxicants into water are, in general, preferred as the toxicants precipitate in the water in substantially colloidal form and when such a slurry or suspension is applied to the plant the foliage of the plant is thoroughly but adequately covered with the toxicant and the minute particles of the toxicant firmly lodge in the irregularities of the plant surface so that the toxicant is not dislodged by rain nor the flexing of the plant by wind. Satisfactory sprays for general use contain from about one-half pound to 2 lbs. of the toxicant in 100 gallons of water, this amount of chemical to be applied per acre. Emulsifying agents or suspending agents may be used or not as desired; in general if the spraying device has mechanism for continually agitating the spray compositions, little or no emulsifying agent need be used but where it is desired to maintain the toxicants in suspension for several hours without agitation a higher amount of emulsifying agent is desirable. The amount of emulsifying agent preferably runs from about 5 lbs. to 10 lbs. per 100 lbs. of toxicant but desirably as little emulsifying agent is used as is possible, consistent with the desired emulsion characteristics of the spray, so that rain does not reemulsify the toxicant after it is applied to the plant and wash it off of the plant.

The insecticides contemplated herein prevent attack by chewing insects upon plants or other material to which the insecticides are applied and they have high residual toxicity. With respect to plants they have a high margin of safety in that, when used in sufficient amount to kill or repel the insects, they do not burn or injure the plant and they resist weathering which includes wash-off caused by rain, decomposition by ultra violet light, oxidation or hydrolysis in the presence of moisture or, at least, such decomposition, oxidation and hydrolysis as materially decrease the desirable insecticidal characteristics of the toxicants or impart undesirable characteristics, for instance phytotoxicity, to the toxicants. As previously stated the toxicants are so chemically inert that they are compatible with substantially any other constituents of the spray schedule. The low water solubility of the toxicants enable them to be used in the soil upon seeds or the roots of plants without injuring either the seeds, roots or plants by imbibition or root-uptake and they have such low mammalian toxicity that when applied to either the foliage of a plant or the parts of a plant which are below the surface of the soil, for instance tubers and the like, either humans or animals consuming the plants are not injured although, with respect to insects, they kill where the insects imbibe them either through food or, as in the case of the mosquito larvae, through imbibition from the environment.

What is claimed is:

1. Method of killing insects which comprises applying lethal doses of a toxicant member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, to a material upon which the insects feed.

2. Method of rendering a material, which is subject to attack by chewing insects, resistant to such attack which comprises applying to such material a member of the group consisting of 9,9'-bifluorylidene, complexes of 9,9'-bifluorylidene and picric acid, complexes of 9,9'-bifluodylidene and 1,3,5-trinitrobenzene, complexes of 9,9'-bifluorylidene and 2,4,7-trinitrofluorenone and complexes of 9,9'-bifluorylidene and sulfur, in an amount sufficient to effect such resistance.

3. Method of rendering a material, which is subject to attack by chewing insects, resistant to such attack which comprises applying to such material a toxicant member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, in an amount sufficient to effect such resistance, the toxicant being in finely divided form.

4. Method of rendering a material, which is subject to attack by chewing insects, resistant to such attack which comprises applying to such material a toxicant member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, in an amount sufficient to effect such resistance, the toxicant being in substantially colloidal form.

5. Method of rendering a plant, which is subject to attack by chewing insects, resistant to such attack which comprises applying to the plant a composition comprising a diluent and member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, until the plant is substantially covered by the composition, the composition containing from about 0.03 to 0.25 part by weight of the toxicant with sufficient diluent to give 100 parts.

6. A concentrate adapted to be diluted with an inert pesticidal adjuvant to yield an insecticide comprising, as a toxicant, a member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, together with a surface active agent.

7. A concentrate adapted to be diluted with an inert pesticidal adjuvant to yield an insecticide comprising, as a toxicant, a major amount of member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, together with a minor amount of a surface active agent.

8. A concentrate adapted to be diluted with an inert pesticidal adjuvant to yield an insecticide comprising, as a toxicant, a member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur together with a surface active agent and a small amount of inert pesticidal adjuvant.

9. A concentrate adapted to be diluted with an inert pesticidal adjuvant to yield an insecticide comprising, as a toxicant, a member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur, together with a surface active agent and an inert pesticidal adjuvant, both the toxicant and the inert pesticidal adjuvant being in finely divided solid form.

10. A composition attractive and poisonous to insects comprising a member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur together with a food as a bait for the insects.

11. A composition attractive and poisonous to insects comprising a member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur together with an attractant for the insects.

12. A material which is subject to attack by chewing insects having incorporated in it a member of the group consisting of 9,9'-bifluorylidene, complexes of 9,9'-bifluorylidene and picric acid, complexes of 9,9'-bifluorylidene and 1,3,5-trinitrobenzene, complexes of 9,9'-bifluorylidene and 2,4,7-trinitrofluorenone and complexes of 9,9'-bifluorylidene and sulfur in sufficient amount to resist the attack of the insects.

13. Method of rendering a material which is subject to attack by chewing insects resistant to such attack which comprises applying 9,9'-bifluorylidene to such material in an amount sufficient to effect such resistance.

14. Method of rendering a plant which is subject to attack by chewing insects resistant to such attack which comprises applying to the plant a composition, comprising 0.03 to 0.25 part by weight of 9,9'-bifluorylidene and sufficient diluent to give 100 parts, until the plant is substantially covered by the composition.

15. Method of killing insects which comprises applying lethal doses of 9,9'-bifluorylidene to a material upon which the insects feed.

References Cited in the file of this patent

FOREIGN PATENTS 771,866   France _____ Oct. 18, 1934

OTHER REFERENCES

Questel: U. S. Dept. of Agr., Bur. of Entomology and Plant Quarantine, pub. E–557, December 1941, pp. 9, 13, 15 and 16 relied on.

Hager et al.: J. Am. Pharm. Asso., Sci. Ed., January 1953, pp. 9–12, vol. 42, No. 1.

Chem. and Eng. News, Feb. 23, 1948, p. 500.

Chem. Abst., vol. 6, (1912), pp. 1145 and 1146.

Chem. Abst., vol. 26 (1932), p. 4330.